United States Patent
Kobayashi et al.

(12) 
(10) Patent No.: US 6,942,160 B2
(45) Date of Patent: Sep. 13, 2005

(54) EXPANSION VALVE

(75) Inventors: Kazuto Kobayashi, Tokyo (JP); Masamichi Yano, Tokyo (JP); Kazuhiko Watanabe, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 0 days.

(21) Appl. No.: 10/600,702

(22) Filed: Jun. 23, 2003

(65) Prior Publication Data

US 2004/0011078 A1 Jan. 22, 2004

(30) Foreign Application Priority Data

Jul. 17, 2002 (JP) ...................................... 2002-208217

(51) Int. Cl.[7] .............................................. F25B 41/04
(52) U.S. Cl. ........................ 236/92 B; 62/225; 62/528
(58) Field of Search ........................ 62/225, 527, 528; 236/92 B

(56) References Cited

U.S. PATENT DOCUMENTS

| | | | |
|---|---|---|---|
| 3,855,836 A | | 12/1974 | Takahashi et al. |
| 3,858,406 A | * | 1/1975 | Izumi ............................ 62/210 |
| 4,468,054 A | * | 8/1984 | Orth ........................ 285/124.3 |
| 4,542,852 A | * | 9/1985 | Orth et al. .................. 236/92 B |
| 5,146,766 A | * | 9/1992 | Martins ........................ 62/298 |
| 5,169,178 A | * | 12/1992 | Hunzinger .................... 285/26 |
| 5,269,459 A | * | 12/1993 | Thompson et al. ......... 236/92 B |
| 5,308,125 A | * | 5/1994 | Anderson, Jr. ............... 285/349 |
| 5,467,611 A | * | 11/1995 | Cummings et al. ............ 62/299 |
| 5,555,739 A | * | 9/1996 | Kujirai et al. ................. 62/244 |
| 5,556,138 A | * | 9/1996 | Nakajima et al. ......... 285/124.4 |
| 5,724,817 A | | 3/1998 | Nishishita |
| 5,732,570 A | | 3/1998 | Tomatsu et al. |
| 5,826,438 A | * | 10/1998 | Ohishi et al. ................. 62/199 |
| 6,053,417 A | * | 4/2000 | Hotta et al. ............... 236/92 B |
| 6,062,484 A | * | 5/2000 | Eybergen .................. 236/92 B |
| 6,189,333 B1 | * | 2/2001 | Cummings et al. ........... 62/474 |
| 6,241,157 B1 | * | 6/2001 | Yano et al. ............... 236/92 B |
| 6,352,207 B1 | * | 3/2002 | Kawakami et al. ....... 236/92 B |
| 6,375,086 B1 | * | 4/2002 | Babin et al. .............. 236/92 B |
| 6,615,599 B1 | * | 9/2003 | Pettitt et al. .................. 62/197 |

FOREIGN PATENT DOCUMENTS

| | | | |
|---|---|---|---|
| DE | 2946466 | * | 2/1985 |
| EP | 0691517 A1 | | 1/1996 |
| GB | 203391 A | * | 10/1981 |
| GB | 2073391 A1 | | 10/1981 |
| JP | 7-329549 A1 | | 12/1995 |
| JP | 8-152232 A1 | | 6/1996 |
| JP | 4008152232 A | * | 6/1996 |

* cited by examiner

*Primary Examiner*—Mohammad M. Ali
(74) *Attorney, Agent, or Firm*—Rader, Fishman & Grauer PLLC

(57) ABSTRACT

An evaporator 10 of an air conditioner comprises a refrigerant entrance port 12 and a refrigerant exit port 14. A division wall 16 of the evaporator is extended to form a housing 200. The housing 200 comprises an inlet 210 for the refrigerant traveling from a compressor, an outlet 220 communicating with the entrance port 12 of the evaporator, and a refrigerant path 230 returning from the evaporator. The cassette unit 100 comprises a pipe member 110, a flange member 120 and a lid member 130, with major components of the expansion valve such as a diaphragm and a driving member for driving a valve means assembled thereto. The cassette unit 100 is accommodated in a hole 240 with steps of the housing 200 to complete the expansion valve.

4 Claims, 5 Drawing Sheets

EXPANSION VALVE

FIELD OF THE INVENTION

The present invention relates to an expansion valve used in an air conditioner of a car or the like, and especially relates to an expansion valve having its main components constituting a cassette unit which can be accommodated in a housing to complete the functions of the expansion valve.

DESCRIPTION OF THE RELATED ART

The expansion valve used in an air conditioner of a car or the like is generally composed of a valve body formed of an aluminum alloy or the like, a valve seat disposed within the valve body, a valve member disposed so as to come into contact with the valve seat, and a drive means for driving the valve member.

The valve body is provided with a refrigerant entrance through which the refrigerant coming from a compressor enters, a refrigerant exit through which the refrigerant traveling toward an evaporator exits, and a valve chamber disposed between the entrance and the exit.

The valve body is further equipped with a refrigerant passage through which refrigerant returning to the compressor from the evaporator travels. The drive means of the valve member includes a diaphragm, and the displacement of the diaphragm is transmitted via a shaft to the valve member.

SUMMARY OF THE INVENTION

The conventional expansion valve explained above has been provided as a completed component that constitutes a main portion of the air conditioner.

The present invention provides a cassette unit containing the main components of the expansion valve, and by inserting (assembling) this cassette unit to a separately prepared housing via seal members, the present invention completes the functions of the expansion valve.

The housing is either adjacent to or formed integrally with the evaporator, so as to cut down the overall size and weight of the air conditioner.

The present expansion valve is composed of a cassette unit equipped with the main components of the expansion valve, and a housing having refrigerant paths and accommodating the cassette unit via seal members. The cassette unit comprises a pipe member, a refrigerant path disposed to the pipe member, a flange member connected to the end of the pipe member, a lid member covering the flange member, a diaphragm disposed between the flange member and the lid member, and a valve mechanism that transfers the displacement of the diaphragm to the valve member so as to control the flow of refrigerant. Further, the housing is formed integrally with the evaporator of the air conditioner.

The housing is joined to the evaporator through a brazing means, and the expansion valve is further equipped with a pipe that connects the housing to the evaporator.

Furthermore, the housing can be disposed within a refrigerant tank of the evaporator.

DETAILED DESCRIPTION OF THE PREFERRED EMBODIMENT

Figure 1:
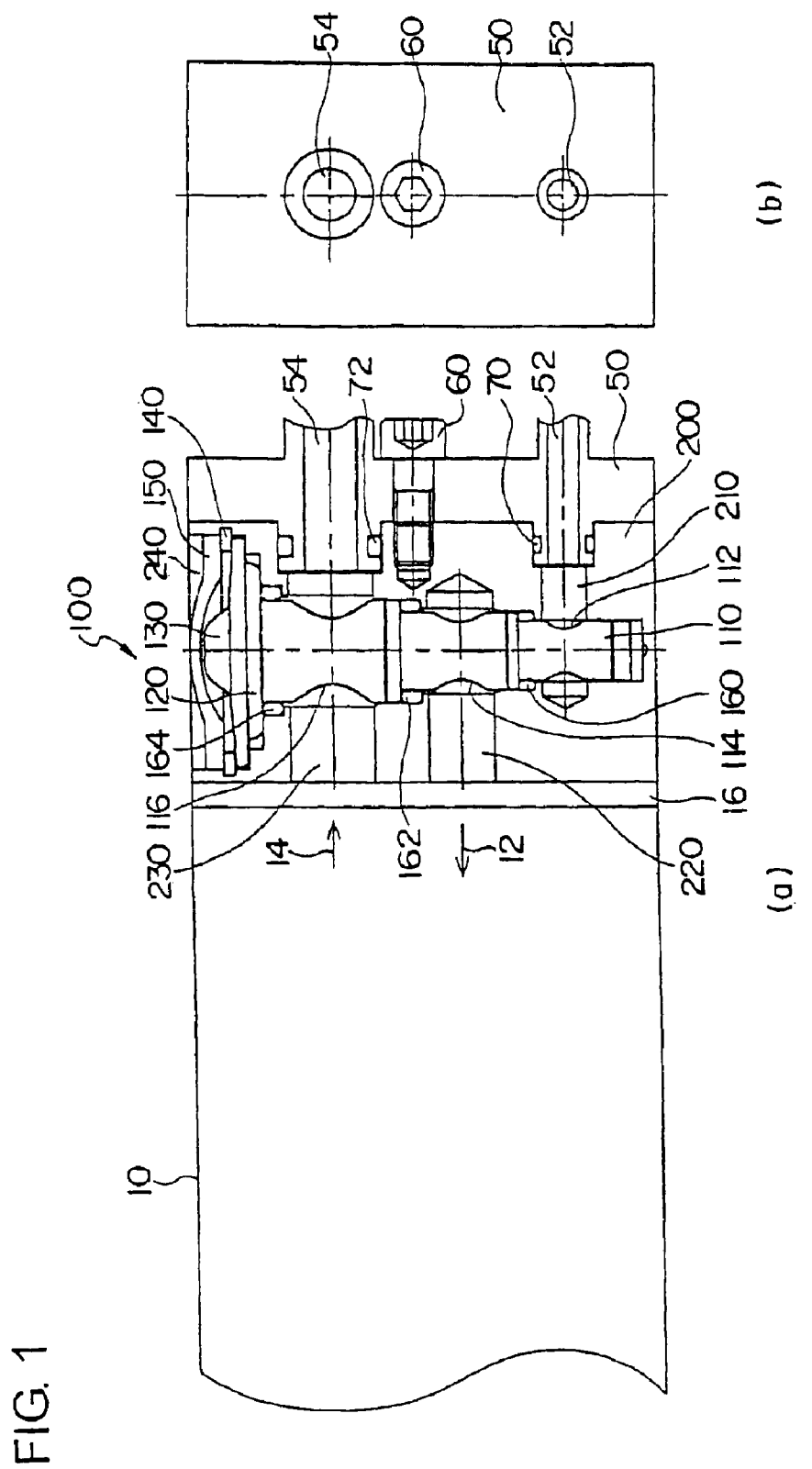
FIG. 1 is an explanatory view illustrating one preferred embodiment of the present invention.

FIG. 1 shows a cross-sectional view (a) and a right side view (b) illustrating the mounting structure of the cassette-type expansion valve according to the present invention.

In an air conditioner of a car, an evaporator 10 of the air conditioner is positioned at the inner side of a dashboard near the driver's seat of the car.

The evaporator 10 comprises an entry port 12 through which high-pressure refrigerant enters and an exit port 14 through which refrigerant having completed heat change exits, and the evaporator 10 is covered with a division wall 16.

The housing 200 is either mounted to this division wall 16 or formed as a portion of the extended division wall itself. The housing 200 comprises an inlet 210 for the refrigerant entering the housing from a compressor, an outlet 220 for sending the refrigerant having a controlled flow toward the entrance port 12 of the evaporator, and a return path 230 that connects to the exit port 14 of the evaporator.

The housing 200 further comprises a mounting hole 240 with steps formed in the direction orthogonal to the above-mentioned refrigerant paths, into which is inserted a cassette unit 100 of the expansion valve.

The cassette unit 100 comprises a pipe member 110, and the pipe member 110 is equipped with an entrance hole 112 for the refrigerant, an exit hole 114 for the refrigerant traveling toward the evaporator, and a through-hole 116 for the refrigerant returning from the evaporator. The upper end of the pipe member 110 is connected to a flange member 120, and the flange member 120 is covered with a lid member 130.

A diaphragm is disposed between the flange member 120 and the lid member 130, and the displacement of the diaphragm is transmitted to the valve member via a valve shaft. The movement of the valve member controls the flow of the refrigerant flowing in through the entrance hole 112, and the controlled flow of refrigerant is supplied through the exit hole 114 toward the entrance port 12 of the evaporator. The refrigerant returning from the exit port 14 of the evaporator passes through the through-hole 116, where the pressure and the temperature information of the refrigerant are transmitted to the diaphragm. The functions of the expansion valve mentioned above are the same as those of an ordinary expansion valve.

The cassette unit 100 is sealed to the mounting hole 240 of the housing via seal rings 160, 162, 164 and so on. The upper portion of the lid member 130 is fixed by an O-ring 140 and covered with a rubber cap 150 that prevents foreign matter from entering the valve.

On the opposite side of the housing 200 from the evaporator 10 is disposed a flange 50 fixed thereto via a bolt 60. This flange 50 comprises a path 52 that communicates with the outlet of the compressor and a path 54 that communicates with the inlet of the compressor, and is mounted to the housing 200 via seal rings 70 and 72.

Since the cassette unit 100 of the expansion valve is disposed adjacent to the evaporator 10, the overall size and weight of the air conditioner can be reduced. Thus, less mounting space is required.

Figure 2:
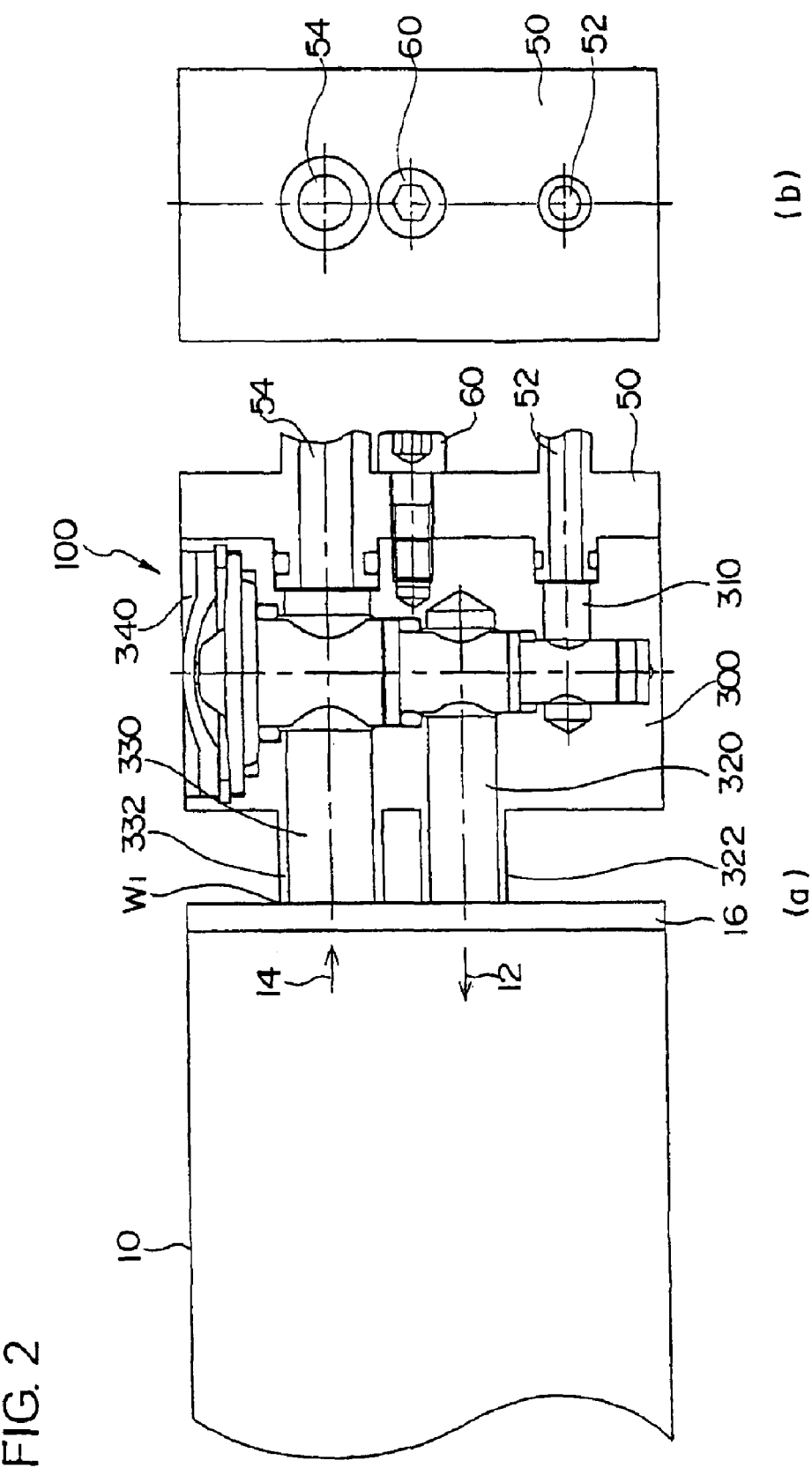
FIG. 2 is an explanatory view illustrating another embodiment of the present invention.

FIG. 2 is a cross-sectional view showing another embodiment of the present invention.

A housing 300 is disposed so as to connect to a refrigerant entrance port 12 and a refrigerant exit port 14 that are formed on a division wall 16 of the evaporator 10.

The housing 300 comprises a refrigerant inlet 310 for the refrigerant entering the housing from a compressor, and an outlet 320 for sending the refrigerant having a controlled flow toward the entrance port 12 of the evaporator, the connection between the entrance port 12 being formed to a pipe portion 322. The housing further comprises a refrigerant return path 330 connected to the exit port 14 of the evaporator, and the connection with the exit port 14 is formed to a pipe portion 332. Both pipe portions 322 and 332 are joined to the division wall 16 via brazing means $W_1$.

The housing 300 further comprises a mounting hole 340 with steps formed in the direction orthogonal to the above-mentioned refrigerant paths, into which is inserted the cassette unit 100 of the expansion valve.

The structure of the cassette unit 100 is the same as that explained in the embodiment of FIG. 1, so the explanation thereof is omitted.

On the opposite side of the housing 300 from the evaporator 10 is disposed a flange 50 fixed thereto via a bolt 60. This flange 50 comprises a path 52 that communicates with the outlet of the compressor and a path 54 that communicates with the inlet of the compressor.

The mounting structure of the cassette unit to the housing 300 is the same as that explained in the embodiment of FIG. 1, so the explanation thereof is omitted.

Figure 3:
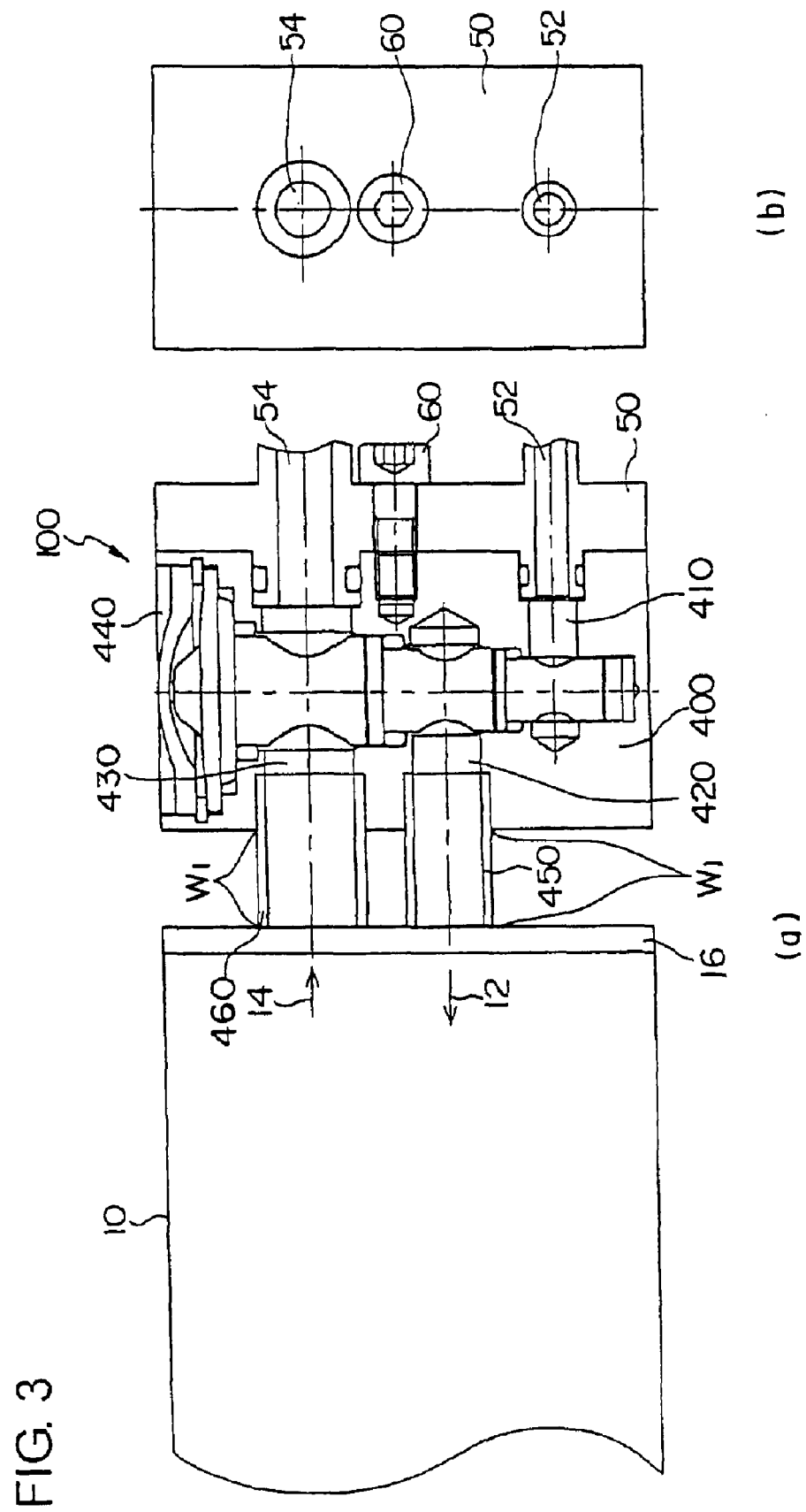
FIG. 3 is an explanatory view illustrating another embodiment of the present invention.

FIG. 3 is a cross-sectional view showing another embodiment of the present invention.

A housing 400 is disposed so as to connect to a refrigerant entrance port 12 and a refrigerant exit port 14 that are formed on a division wall 16 of the evaporator 10.

The housing 400 comprises a refrigerant inlet 410 for the refrigerant entering the housing from a compressor, and an outlet 420 for sending the refrigerant having a controlled flow toward the entrance port 12 of the evaporator. The housing 400 is connected to the entrance port 12 via a pipe 450. The housing further comprises a refrigerant return path 430 that connects to the exit port 14 of the evaporator, and the housing is connected to the exit port 14 via a pipe 460. Both pipes 450 and 460 are joined with the division wall 16 and the housing 400 via brazing means $W_1$.

The housing 400 further comprises a mounting hole 440 with steps formed in the direction orthogonal to the above-mentioned refrigerant paths, which accommodates the cassette unit 100 of the expansion valve.

The structure of the cassette unit 100 is the same as that explained with reference to FIG. 1, so the explanation thereof is omitted.

On the opposite side of the housing 400 from the evaporator 10 is disposed a flange 50 fixed thereto via a bolt 60. This flange 50 comprises a path 52 that communicates with the outlet of the compressor and a path 54 that communicates with the inlet of the compressor.

The mounting structure of the cassette unit to the housing 400 is the same as that explained in the embodiment of FIG. 1, so the explanation thereof is omitted.

Figure 4:
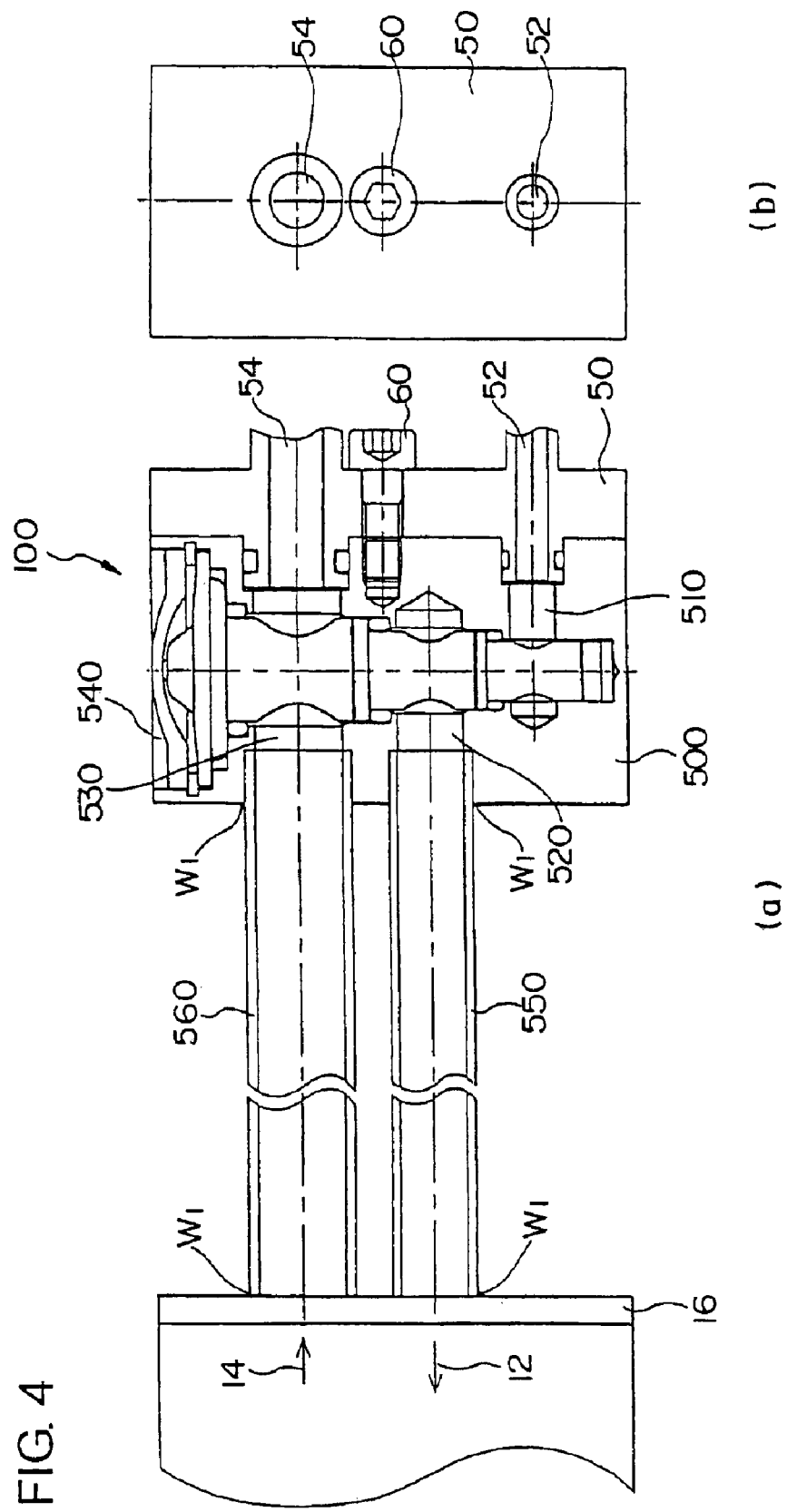
FIG. 4 is an explanatory view illustrating yet another embodiment of the present invention.

FIG. 4 is a cross-sectional view showing another embodiment of the present invention.

A housing 500 is disposed so as to connect to a refrigerant entrance port 12 and a refrigerant exit port 14 that are formed on a division wall 16 of the evaporator 10.

The housing 500 comprises a refrigerant inlet 510 for the refrigerant entering the housing from a compressor, and an outlet 520 for sending the refrigerant having a controlled flow toward the entrance port 12 of the evaporator. The housing 500 is connected to the entrance port 12 via a pipe 550. The housing further comprises a refrigerant return path 530 that connects to the exit port 14 of the evaporator, and the housing is connected to the exit port 14 via a pipe 560. Both pipes 550 and 560 are joined with the division wall 16 and the housing 500 via brazing means $W_1$.

The housing 500 further comprises a mounting hole 540 with steps formed in the direction orthogonal to the above-mentioned refrigerant paths, which accommodates the cassette unit 100 of the expansion valve.

The structure of the cassette unit 100 is the same as that explained with reference to FIG. 1, so the explanation thereof is omitted.

On the opposite side of the housing 500 from the evaporator 10 is disposed a flange 50 fixed thereto via a bolt 60. This flange 50 comprises a path 52 that communicates with the outlet of the compressor and a path 54 that communicates with the inlet of the compressor.

The mounting structure of the cassette unit to the housing 500 is the same as that explained in the embodiment of FIG. 1, so the explanation thereof is omitted.

According to this structure, the evaporator 10 and the housing 500 are communicated via long pipes 550 and 560, so the housing 500 constituting the expansion valve can be disposed inside an engine room of the car.

Figure 5:
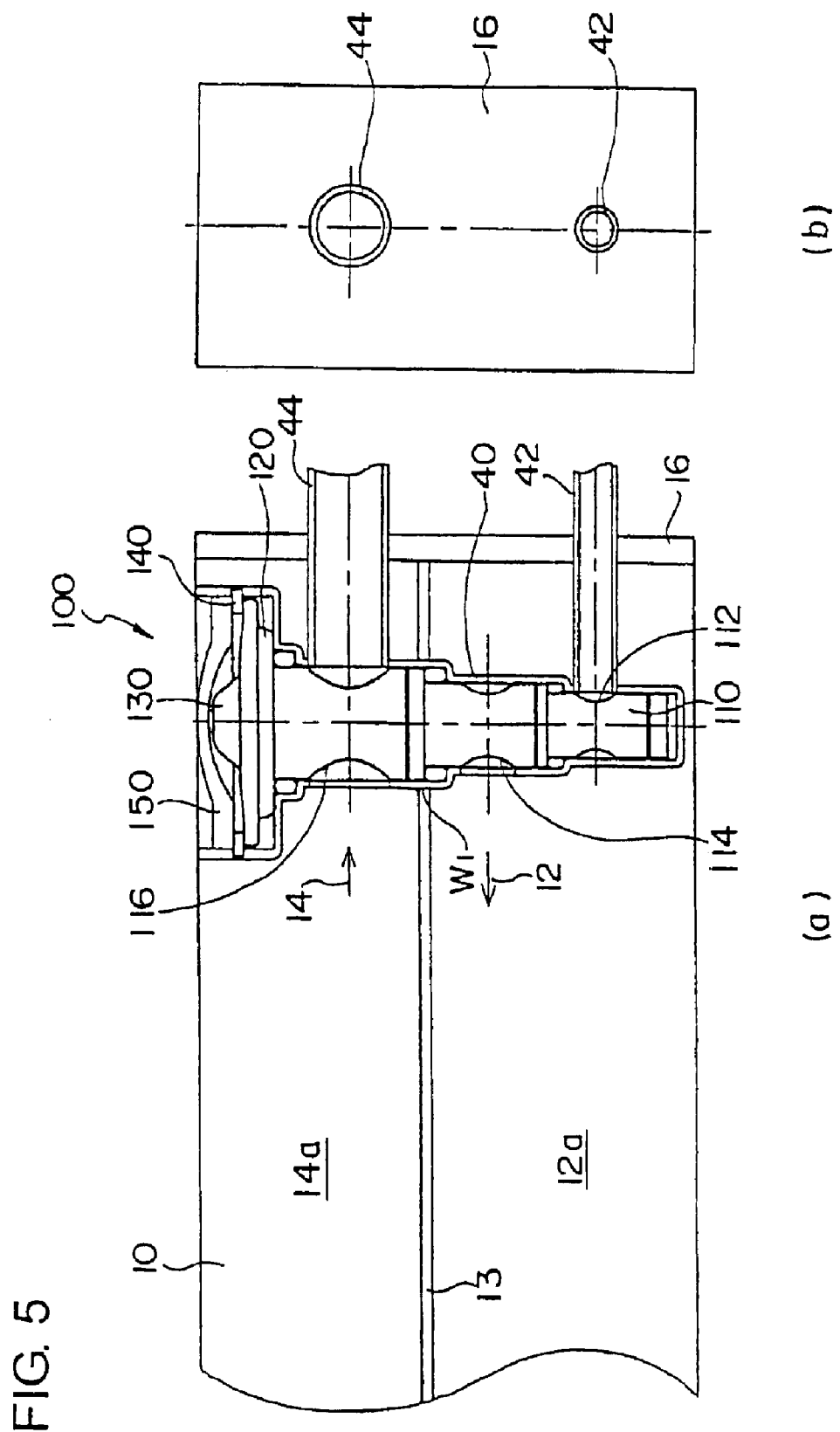
FIG. 5 is an explanatory view illustrating yet another embodiment of the present invention.

FIG. 5 is a cross-sectional view showing yet another embodiment of the present invention.

The evaporator 10 comprises an inlet tank 12a that is connected to an entrance port 12 of the refrigerant, an outlet tank 14a that is connected to an exit port 14 of the refrigerant, and a plate 13 that divides the two tanks. A pipe-shaped housing 40 with steps is formed to the inner portion of the evaporator 10, for accommodating the cassette unit 100 of the expansion valve. The structure of the cassette unit 100 is the same as that explained in the embodiment of FIG. 1, so the explanation thereof is omitted.

Two pipes 42 and 44 pass through the division wall 16 of the evaporator 10 and connect to the housing 40. The pipe 42 is connected to the discharge side of the compressor and the pipe 44 is connected to the inlet side of the compressor.

As explained, the present expansion valve is composed of a cassette unit including a valve mechanism that constitutes the main portion of the expansion valve and a drive unit of the valve mechanism, and a housing having refrigerant paths formed as a separate structure from the cassette unit.

The expansion valve is completed by inserting the cassette unit to the housing and providing a seal structure.

Therefore, according to the present invention, the freedom of design of the expansion valve is improved, and for example, the housing can be disposed adjacent to the evaporator or even within the evaporator. Moreover, the number of components constituting the expansion valve is reduced, and the overall size and weight of the air conditioner can be minimized.

What is claimed is:

1. An expansion valve assembly, comprising:
    an expansion valve cassette unit including an expansion valve cassette flange member and a stepped-down pipe member connected to the expansion valve cassette flange member, the stepped-down pipe member defined by a first pipe section having a first diameter and a first through hole formed therethrough, a second pipe section having a second diameter and a second through hole formed therethrough and a third pipe section having a third diameter and a third through hole formed therethrough with the second pipe section connected to and between the first and third pipe sections and the second diameter being smaller than the first diameter and being larger than the third diameter and the first pipe section connected to the expansion valve cassette flange member;

a housing having a housing refrigerant path extending along a longitudinal direction and a stepped-down expansion valve cassette unit hole extending transversely to and through the housing refrigerant path and sized for accommodating the expansion valve cassette unit in a close-fitting relationship, the stepped-down expansion valve cassette unit hole defined by a mounting hole, a first hole section having a first hole diameter, a second hole section having a second hole diameter and a third hole section having a third hole diameter in communication with one another such that the mounting hole receives the expansion valve cassette flange member, the first hole section receives the first pipe section, the second hole section receives the second pipe section and the third hole section receives the third pipe section, the housing refrigerant path including a first housing refrigerant path portion having a refrigerant exit hole and aligned with the first through hole of the first pipe section, a second refrigerant path portion aligned with the second through hole of the second pipe section and a third refrigerant path portion having a refrigerant entrance hole and aligned with the third through hole of the third pipe section, the first housing refrigerant path portion, the second refrigerant path portion and the third refrigerant path portion disposed apart from and parallel to one another, the refrigerant entrance hole and the refrigerant exit hole formed into a common side surface of the housing; and a generally flat flange having a refrigerant entrance path defined by a first flange pipe section and a refrigerant exit path defined by a second flange pipe section, the first and second flange pipe sections projecting from a common flat surface of the flange and extending parallel to one another, the refrigerant entrance hole sized and adapted to receive the first flange pipe section in a sealed manner and the refrigerant exit hole sized and adapted to receive the second flange pipe section in a sealed manner, the flange connected to the housing with the flat surface of the flange and the common side surface of the housing being in face-to-face contact with each other.

2. An expansion valve assembly according to claim 1, further comprising a bolt wherein the flange is connected to the housing by the bolt extending into and through the flange and into the common side surface of the housing.

3. An expansion valve assembly according to claim 1, further comprising a first seal ring in contact with and surrounding the first flange pipe section and a second seal ring in contact with and surrounding the second flange pipe section, the first and second seal rings being disposed in the respective refrigerant entrance hole and refrigerant exit hole when the flange is connected to the housing.

4. An expansion valve assembly according to claim 1, further comprising a first cassette seal member disposed around the first pipe section and in contact with the housing, the first pipe section and the expansion valve cassette flange member to prevent fluid communication between the mounting hole and the first hole section, a second cassette seal member disposed around the second pipe section and in contact with the housing and the first and second pipe sections to prevent fluid communication between the first hole section and the second hole section and a third cassette seal member disposed around the third pipe section and in contact with the housing and the second and third pipe sections to prevent fluid communication between the second hole section and the third hole section.

* * * * *